(No Model.)

A. A. HOLT & J. P. KOOY.
FLOWER POT AND STAND.

No. 495,808.     Patented Apr. 18, 1893.

WITNESSES:
J. A. Bergstrom
C. Sedgwick

INVENTORS:
A. A. Holt
J. P. Kooy
BY Munn & Co.
ATTORNEYS.

UNITED STATES PATENT OFFICE.

ALFRED A. HOLT, OF BROOKLYN, AND JACOB P. KOOY, OF NEW YORK, N. Y.

FLOWER-POT AND STAND.

SPECIFICATION forming part of Letters Patent No. 495,808, dated April 18, 1893.

Application filed August 24, 1892. Serial No. 443,946. (No model.)

*To all whom it may concern:*

Be it known that we, ALFRED A. HOLT, of Brooklyn, in the county of Kings and State of New York, and JACOB P. KOOY, of New York city, in the county and State of New York, have invented a new and useful Improvement in Flower-Pots and Stands, of which the following is a full, clear, and exact description.

Our invention relates to an improvement in flower pots and stands, and the object of the invention is to provide a stand which is capable of being rendered exceedingly ornamental, and which will also serve as a casing for a flower pot, the stand being so constructed that a lower chamber will be provided for the reception of water, the receptacle containing the water being readily removed from the stand or drawn out therefrom to be filled even when the pot is in position within the stand. The inner face of the stand is metal-lined, and the stand is so shaped that a space will intervene its inner wall and the outer face of the flower pot it is adapted to hold, thus permitting the moisture not only to ascend through the usual orifice in the bottom of the pot but also upward around the sides of the pot to the foliage of the plant contained in the pot.

It is a further object of the invention to construct a pot to fit into the stand in such a manner that the bottom of the pot will enter a predetermined depth in the water receptacle, and also provide the pot with means whereby it may be readily removed when it is so desired.

Another feature of the invention is in so constructing the interior of the stand that in the event water is poured into the pot at the top to moisten the earth, should the water overflow it will be conducted either into the water-receiving receptacle in the bottom of the stand, or into the water-tight compartment within which the said receptacle is located.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
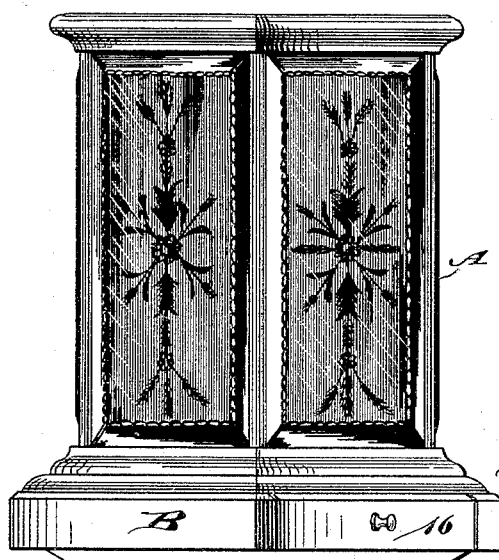
Figure 2:
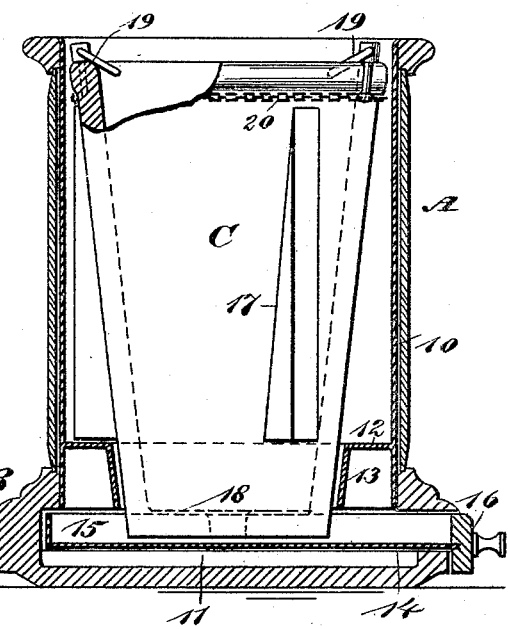
Figure 3:
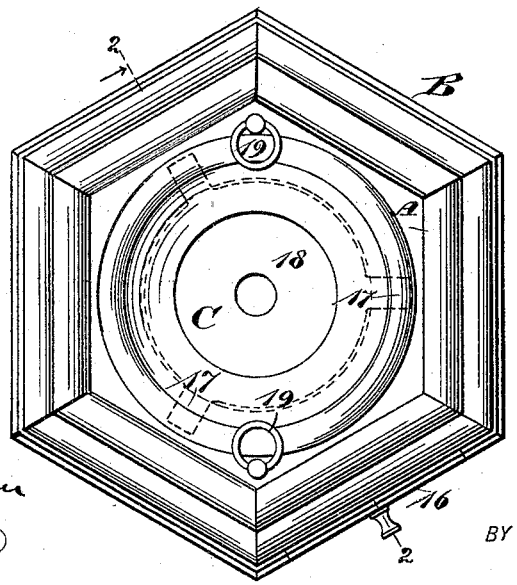

Figure 1 is a side elevation of the stand. Fig. 2 is a central vertical section through the stand, showing the flower pot partially in side elevation therein, and partially in section, the section in the stand being taken essentially on the line 2—2 of Fig. 3; and Fig. 3 is a plan view of the stand and the pot within it.

The stand may be said to consist of an upper casing section A and a base section B. The base and likewise the casing section may be given any desired contour and may be ornamented in any approved manner. In the drawings the casing section is shown as ornamented with exterior glass panels, and the casing section is polygonal in cross section, the base being made up of molding connected in suitable manner. The base may be so constructed that it will rest upon a table or other article of furniture, or other support, or openings may be made in the bottom of the base for the reception of legs, in which event the stand is used independently of any other article of furniture, its only supports being the legs. The interior of the casing section, and likewise preferably the interior of the base, are provided with a water-tight metallic lining 10, but any substitute for metal may be employed if in practice it is found desirable, as, for instance, rubber, porcelain, or the like.

The base section B, is provided with an interior horizontal chamber 11, which chamber is made ordinarily as large as the base section will admit of, and this chamber is in direct communication with the interior chamber of the casing section, the casing section comprising one chamber which is open at the top; and at the lower portion of the casing chamber, just above the base chamber, a horizontal partition 12, is located, said partition being in ring form, and its inner edge is provided with a downwardly-extending annular flange 13, which leads directly to the top of the base chamber, the flange being made preferably conical, inclining inward, as best shown in Fig. 2. This partition and the flange are preferably made of metal, a sheet metal being employed. In the base chamber 11, slide-ways 14, are produced, and in or upon said slide-ways a drawer 15, is supported, and is capable of traveling. The outer face 16 of the drawer, when the drawer is closed, forms a portion of the exterior of the base section, as shown in Fig. 1; and when such drawer is closed its rear end is practically in engagement with the wall of the said base chamber. The drawer is located at or near the central portion of the base, and is provided with a suitable knob, by means of which it may be drawn outward.

The flower pot C, is of the usual shape, but upon its exterior surface a series of vertically arranged ribs 17, is located, the ribs being somewhat wedge-shape in general contour, the widest portion being at the bottom, and the bottom edges of the ribs are located some little distance from the bottom edge of the pot, as is best shown in Fig. 2. When the pot is placed in the casing, its lower or narrow end enters the space surrounded by the flange 13 of the horizontal partition, and the lower ends of the ribs 17 rest upon the horizontal partition 12, and prevent the lower end of the pot from striking the bottom of the drawer, as when the pot is placed in the casing properly the bottom of it will enter the drawer 15, and it is desirable that a space should be left between the bottom of the pot and the bottom of the drawer. The bottom of the pot is provided with the usual aperture 18, to admit water into the interior, and the pot is further provided at its upper edge with handles 19, whereby it may be readily lifted from the casing, when desired, or placed therein. The preferred form of handle is a folding one, and the handles are located opposite each other, being secured at their inner ends to a band or chain 20, encircling the pot beneath its upper rib.

The pot having been placed in the casing, water may be poured upon the earth in the pot from the top of the latter, and the water passing through the earth will be caught by the drawer 15; this drawer is also kept practically filled with water, so that the earth in the pot may absorb the water, and each and every part of the roots of the plant become moist. When the plant is watered from the top of the pot, in the event water should run over the edges of the pot it will be directed by the partition 12 and its flange 13, either into the drawer or into the base compartment 11, from which latter place it may be readily removed, and as this compartment is water-tight nothing from it can injure the carpet or any ornament near to the stand, or anything in the way of support upon which the stand may be located.

This device is exceedingly simple, economic and ornamental, and will act in such manner, when water is constantly kept in the drawer 15, as to keep the earth contained in the pot, the pot itself, and consequently the roots of the plant at all times moist to a sufficient degree to greatly promote the health of the plant and the rapidity of its growth without rendering the soil in any manner soggy or overcharged with moisture.

It will be understood that the drawer is wide enough to receive the entire bottom portion of the flower pot.

Having thus described our invention, we claim as new and desire to secure by Letters Patent—

1. As an improved article of manufacture a flower pot stand, consisting of a chambered base section, a drawer held to slide in the chamber of the base section, and a casing section for holding a flower pot mounted on the base section and provided near its lower end with an apertured partition through which the lower end of the flower pot projects into the said drawer, substantially as described.

2. In a stand for the reception of flower pots, a base section provided with a water-tight compartment therein, a casing section carried by the base, open at the top and in communication with the base compartment, a drawer held to slide in the base compartment, a partition horizontally located in the casing compartment of substantially ring-like form and provided with a downwardly-extending flange forming a portion of its inner edge, the flange leading into the drawer and the base compartment, as and for the purpose set forth.

3. A flower pot for the purpose described, provided with exterior ribs terminating above the lower end of the pot, and handles whereby the pot may be manipulated, as and for the purpose set forth.

4. The combination, with a stand comprising a base having a water-tight compartment, and a drawer having sliding movement in said compartment, and a casing section open at the top and supported by the base, the said casing section being provided with a partition having an opening therein, of a flower pot the lower end of which is adapted to enter the opening in the partition of the casing, ribs formed upon the pot, adapted to engage with the partition and support the lower end of the pot above the bottom of the drawer, and handles attached near the upper edge of the pot, whereby the pot may be manipulated, as and for the purpose set forth.

5. The combination, with a stand for the reception of flower pots, the same consisting of a chambered base section, a drawer having sliding movement in the base section, a casing section open at the top and supported by the base, a horizontal partition secured within the casing compartment, having an opening therein, and a flange extending from the edges of the opening downward, of a flower pot, the lower edge of which enters the opening in the partition and likewise enters the drawer, ribs formed upon the exterior of the pot adapted for engagement with the partition in the casing and to hold the pot from engaging with the bottom of the drawer, and handles attached to the pot near its upper edge, as and for the purpose specified.

ALFRED A. HOLT.
JACOB P. KOOY.

Witnesses:
OTTO H. WENDEROTH,
EDWARD HAGEN.